Sept. 22, 1936.  F. H. SHEPARD, JR  2,054,836
LIGHT RESPONSIVE DEVICE
Filed March 8, 1935
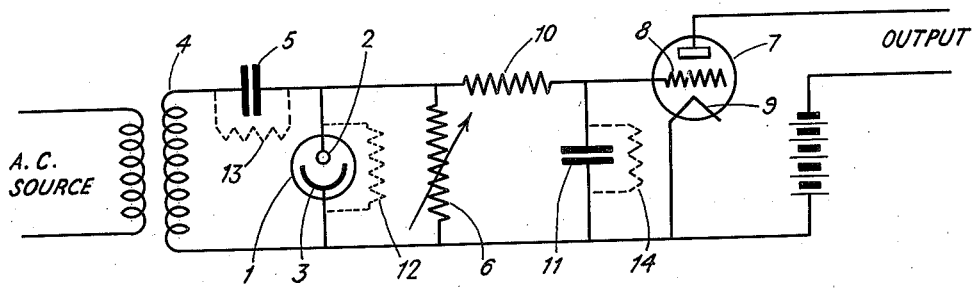
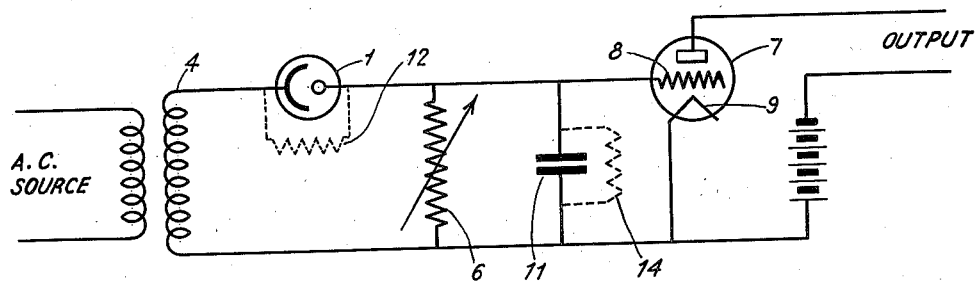
INVENTOR.
FRANCIS H. SHEPARD JR.
BY
Charles McClair
ATTORNEY.

Patented Sept. 22, 1936

2,054,836

UNITED STATES PATENT OFFICE 2,054,836

LIGHT RESPONSIVE DEVICE

Francis H. Shepard, Jr., Rutherford, N. J., assignor, by mesne assignments, to Radio Corporation of America, New York, N. Y., a corporation of Delaware Application March 8, 1935, Serial No. 9,932

3 Claims. (Cl. 250—41.5)

My invention relates to improvements in phototube photometers.

The usual photometer comprises a resistance, a battery and a phototube connected in series. The intensity of light exposed to the phototube determines the magnitude of the current flow in this series circuit. An electric meter is connected to the resistance to measure the current flowing thru it or the voltage drop across it and is so calibrated as to give a direct reading of the intensity of light upon the phototube. In operation the meter is calibrated by noting the needle deflection when the phototube is exposed to sources of light of known intensities. Thereafter unknown light intensities may be measured by reading the electric meter provided the electrical constants of the photometer remain unchanged. It has been found in practice, however, that such an arrangement of comparing light sources is subject to error because, for example, the resistance between the terminals of the phototube may change. This change in resistance would obviously change the current flow in said series circuit, which would destroy the calibration of the meter. More important, the leakage current thru the phototube causes a current flow in the phototube loading impedance even with zero light. Changes in leakage resistance, then, cause changes in the normal or zero setting of the phototube which precludes standardization of the phototube current values in terms of light values. This change in the resistance is due to several factors, such as dirt on the bulb of the phototube, changes in humidity and other factors which affect surface leakage paths over the interior and exterior walls of the tube, as well as variations in leakage paths thru condensers and other elements connected across the phototube.

An object of my invention, therefore, is to produce a photometer with means to compensate for changes in static conditions or parameters in the photometer.

Another object of my invention is to construct a light responsive device, the current values of which are easy to calibrate in terms of light values, which is rugged in construction and which is stable in operation.

I accomplish the results desired by energizing the photometer with alternating current as distinguished from the usual batteries, and by connecting an adjustable resistance of high value in shunt across the terminals of the phototube. The voltage drop across this adjustable shunt resistor is impressed upon a suitable recording relay. By such connections the adjustable resistor is placed in parallel relation with the resistance leakage paths between the terminals of the phototube, the leakage resistance and the adjustable resistor constituting a parallel resistance load across the phototube. If the leakage resistance varies after calibration of the photometer with a finite value of load resistance across the phototube, this load resistance may thereafter be adjusted to said finite value simply by manipulating the adjustable resistor; for example, if the leakage resistance between the terminals of the phototube should be reduced by moisture upon the base or envelope of the phototube or by leakage in the associated circuits the shunt adjustable resistor would be increased in value. So that maximum feasible impedance between the terminals of the phototube may be maintained, with the attendant high degree of phototube sensitivity, an alternating current source is employed to energize the phototube and is connected to the phototube thru a coupling means such as a condenser which offers high impedance to direct current. When alternating current supply is employed to energize my improved photometer, the rectifying action of the phototube serves to convert the alternating current to direct current in the load impedance. That is, the current rectified by the phototube produces across the adjustable resistor a direct current voltage which actuates any suitable recording relay or electric meter.

A better understanding of my invention may be had by referring to the accompanying drawing in which Figure 1 shows a light responsive circuit embodying my invention; and Figure 2 shows a modification thereof in which the phototube loading resistor and alternating current supply is slightly varied in connections.

Referring to Figure 1, in the circuit of my device any desired form of phototube may be employed, as for example the one shown in which the envelope 1 encloses an anode 2 and a light activated cathode electrode 3. For the purpose of energizing the phototube an alternating current supply, which may be connected to the conventional 60 cycle power source, is connected across the terminals of the phototubes in the manner shown. To maintain high impedance between the terminals of the phototube, in one lead between the winding 4 and the connected electrode is inserted a condenser 5. Condenser 5 is preferably so proportioned as to present low impedance to the impressed alternating current and high impedance to direct currents. A load resistor 6 of high value, for example of the order of several megohms, is connected directly across the output of the phototube. For reasons which will appear hereinafter, resistor 6 is made adjustable. At 7 is shown a thermionic relay with its input electrodes 8 and 9 connected across loading impedance 6 thru a filter, which by way of example is shown as a resistor 10 and a condenser 11. Elements 10 and 11 of the filter are so proportioned as to smooth out the fluctuations in voltage appearing across impedance 6. With the exposure of light upon the cathode 3, a space current is caused to flow between the anode 2 and cathode during the impression of each positive loop of the alternating voltage upon the anode. By virtue of the rectifying action of the phototube a direct current potential is built up across the impedance 6, the amplitude of which is controlled by the conductivity of the phototube. Conductivity of the phototube is in turn controlled by, and is directly proportional to the intensity of light impressed upon the cathode. It is seen, therefore, that the intensity of light upon the phototube controls the direct current potential upon the grid 8 of the thermionic relay. The output of the relay may be connected thru a milliameter or any desired recording instrument calibrated in terms of lumens or light intensity.

In practice it has been found that an appreciable reduction in voltage may be caused between the terminals of the phototube by current leakage paths over and thru the insulation of the envelope and base members of the phototube and thru the insulation of the connected condensers. These leakage paths are represented diagrammatically at 12, 13 and 14. Resistance 12, further, is found to vary substantially, due to several factors, such as changes in humidity, and moisture and shifting deposits of dirt on the bulb, and other factors which affect the surface leakage paths over the interior and exterior walls of the bulb and base. The leakage paths thru condensers 5 and 11, which are essentially in parallel with resistance 12, are similarly affected. By reason of the instability of these resistances between the terminals of the phototube it is difficult to maintain the calibration of the circuit. For example, if the output of relay 7 is recorded for a given light intensity upon the phototube and for a finite value of load impedance across the terminals of the tube, any change thereafter in load impedance would result in a corresponding change in voltage across impedance 6 and a corresponding change in anode current thru relay 7. As a convenient means for compensating for these changes in leakage resistances 12, 13 and 14, load resistor 6 is made adjustable. Since resistances 6, 12, 13 and 14 are in parallel, resistance 6 may at any time be manipulated to bring the total of the parallel resistance to any finite value which conveniently may be of a value corresponding to the resistance employed when calibrating the phototube and its circuits.

As distinguished from the usual practice in which the phototube is energized by a battery or other source of potential of low impedance connected across the terminals of the phototube, I employ an alternating current source 4 isolated as to direct current from the phototube by condenser 5. Because of the high direct current impedance of the source substantially the full supply voltage is maintained across the phototube.

In Figure 2 is shown my invention with a modified form of power supply connections. Here the alternating current supply winding 4 is connected in series with the phototube thru condenser 11 and as in Figure 1 resistances 6, 12 and 14 are connected for direct current in parallel and across the terminals of the phototube. The rectifying action of phototube 1 produces a direct current potential across the ends of loading impedance 6. The control circuit of relay 7 is connected directly across impedance 6. In this modification condenser 11 is found to provide sufficient filtering action for the pulsating voltages across impedance 6. Here, as in Figure 1, impedance 6 may be adjusted to compensate for any unwanted variations in leakage resistance 11 thus providing a light measuring device which can be readily adjusted for changes in static parameters.

In my improved circuits, it is significant that although variations in leakage resistance across the phototube cause changes in sensitivity of the phototube, the leakage resistance changes cannot affect the zero light value of current in the output of relay 7. That is, with zero light and zero phototube space current, the direct current potential across coupling impedance 6 is zero.

While I have shown the preferred embodiments of my invention it is obvious that many variations may be used within the scope of my invention. It is accordingly desired that my invention be limited only by the prior art and by the accompanying claims.

I claim:

1. In a light measuring circuit, a phototube comprising an envelope containing an anode electrode and a light irradiated cathode electrode, and terminal members in the wall of said envelope for said electrodes, a load impedance for said phototube comprising a resistance having a value of the order of the leakage resistance between said terminal members connected at one end to one of said terminal members, and connected at its other end to shunt the resistance between the terminals of said phototube said resistance being adjustable to adjust the total inter-terminal impedance to a predetermined value, and means for applying an alternating voltage across the terminals of said phototube.

2. In a photometer, a phototube comprising an anode and a light responsive cathode, an adjustable resistor of relatively high value connected directly between said anode and said cathode, a circuit of high direct current impedance and low alternating current impedance connected between said anode and said cathode, and a source of alternating current potential in said circuit, and the input of a relay connected across said resistor.

3. In a light responsive device, a phototube comprising an anode electrode and a cathode electrode, an alternating current source in series with a condenser connected between said electrodes, a load resistor connected directly between said electrodes, an electron relay with an input circuit, and means for coupling said input circuit to said resistor.

FRANCIS H. SHEPARD, Jr.